(12) United States Patent
Hirono et al.

(10) Patent No.: US 10,086,486 B2
(45) Date of Patent: Oct. 2, 2018

(54) PART-HOLDING DEVICE AND MACHINE TOOL PROVIDED WITH SAID PART-HOLDING DEVICE

(71) Applicant: MITSUBISHI HEAVY INDUSTRIES MACHINE TOOL CO., LTD., Ritto-shi, Shiga (JP)

(72) Inventors: Yoko Hirono, Tokyo (JP); Noritaka Fujimura, Tokyo (JP); Kazuyuki Ishizu, Tokyo (JP)

(73) Assignee: MITSUBISHI HEAVY INDUSTRIES MACHINE TOOL CO., LTD., Ritto-Shi (JP)

( * ) Notice: Subject to any disclaimer, the term of this patent is extended or adjusted under 35 U.S.C. 154(b) by 0 days.

(21) Appl. No.: 15/500,220

(22) PCT Filed: Jul. 31, 2015

(86) PCT No.: PCT/JP2015/071742
§ 371 (c)(1),
(2) Date: Jan. 30, 2017

(87) PCT Pub. No.: WO2016/027642
PCT Pub. Date: Feb. 25, 2016

(65) Prior Publication Data
US 2017/0266773 A1    Sep. 21, 2017

(30) Foreign Application Priority Data

Aug. 21, 2014  (JP) .................................. 2014-168093

(51) Int. Cl.
*B23Q 7/04* (2006.01)
*B23F 5/22* (2006.01)
(Continued)

(52) U.S. Cl.
CPC ................ *B23Q 7/043* (2013.01); *B23F 5/22* (2013.01); *B23F 23/04* (2013.01); *B25J 15/04* (2013.01);
(Continued)

(58) Field of Classification Search
CPC ... B23Q 3/00; B23Q 3/02; B23Q 3/06; B23Q 3/101; B23Q 3/102; B23Q 3/103;
(Continued)

(56) References Cited

U.S. PATENT DOCUMENTS 590,820 A * 9/1897 Breul .................... B25B 1/2473
269/134
2,546,455 A * 3/1951 Labrozzi ............. B23B 27/1625
407/10
(Continued)

FOREIGN PATENT DOCUMENTS

JP      60-141445 A    7/1985
JP      3-142106 A     6/1991
(Continued)

OTHER PUBLICATIONS

International Preliminary Report on Patentability and English translation of the Written Opinion of the International Searching Authority (forms PCT/IB/373, PCT/ISA/237 and PCT/IB/338), dated Mar. 2, 2017, for International Application No. PCT/JP2015/071742.
(Continued)

*Primary Examiner* — Daniel Howell
*Assistant Examiner* — Yasir Diab
(74) *Attorney, Agent, or Firm* — Birch, Stewart, Kolasch & Birch, LLP (57) ABSTRACT

A part-holding device includes a holding portion configured to hold an object to be held and a main body configured to detachably connected to the holding portion. The main body has a first surface, a second surface, and a third surface
(Continued)

oriented in respective differing directions, and the holding portion has a first abutting surface, a second abutting surface and a third abutting surface capable of abutting against the first surface, the second surface, and the third surface, respectively. The part-holding device further includes pressing means configured to press the holding portion to cause the first abutting surface to abut against the first surface and to cause the second abutting surface to abut against the second surface, and fixing means configured to cause the third abutting surface to abut against the third surface and to fix the holding portion to the main body.

5 Claims, 9 Drawing Sheets (51) Int. Cl.
*B23F 23/04* (2006.01)
*B25J 15/04* (2006.01)
*B23Q 3/10* (2006.01)
*B23Q 3/06* (2006.01)
*B25B 11/02* (2006.01)

(52) U.S. Cl.
CPC .............. *B23Q 3/06* (2013.01); *B23Q 3/105* (2013.01); *B23Q 7/047* (2013.01); *B25B 11/02* (2013.01)

(58) Field of Classification Search
CPC .......... B23Q 3/105; B23Q 7/00; B23Q 7/043; B23Q 7/047; B25J 15/04; B23F 23/04; B25B 11/00; B25B 11/02
USPC .................. 269/228, 201, 134–136; 74/608
See application file for complete search history.

(56) References Cited

U.S. PATENT DOCUMENTS

| | | | | |
|---|---|---|---|---|
| 2,685,874 A * | 8/1954 | Ford | ................... | B25D 17/046 16/426 |
| 3,475,990 A * | 11/1969 | Maximuk | .......... | B23Q 11/0078 74/608 |
| 4,985,971 A * | 1/1991 | Kitamura | ................. | B23Q 7/10 198/346.1 |
| 5,112,164 A | 5/1992 | Pano | | |
| 5,800,079 A * | 9/1998 | Qvarth | ................. | B23C 5/2226 144/230 |
| 6,874,773 B1* | 4/2005 | Newbould | ............... | B23Q 3/18 269/63 |
| 7,959,386 B2* | 6/2011 | Hara | .................. | B23Q 11/0891 409/134 |
| 2004/0161311 A1* | 8/2004 | Satran | ....................... | B23C 5/08 407/46 |
| 2005/0019118 A1* | 1/2005 | Elbaz | ...................... | B23B 27/04 408/186 |
| 2006/0140732 A1* | 6/2006 | Hecht | .................. | B23B 27/141 408/199 |
| 2011/0110732 A1 | 5/2011 | Elbaz et al. | | |
| 2013/0129437 A1* | 5/2013 | Sevdic | .................... | B23B 27/04 407/102 |

FOREIGN PATENT DOCUMENTS

| | | |
|---|---|---|
| JP | 2012-166330 A | 9/2012 |
| JP | 2013-510010 A | 3/2013 |

OTHER PUBLICATIONS

International Search Report and Written Opinion of the International Searching Authority (forms PCT/ISA/210, PCT/ISA/237 and PCT/ISA/220), dated Oct. 27, 2015, for International Application No. PCT/JP2015/071742, along with an English translation of the International Search Report.

* cited by examiner

PART-HOLDING DEVICE AND MACHINE TOOL PROVIDED WITH SAID PART-HOLDING DEVICE

TECHNICAL FIELD

The present invention relates to a part-holding device capable of easy set-up change, and to a machine tool provided with the part-holding device.

BACKGROUND ART

In a machine tool that machines objects to be machined (workpieces) having various shapes and dimensions, changing a workpiece to be machined may result in a workpiece having different shape and dimensions and may require that a member provided in the machine tool be changed, namely, may require a set-up change. For the set-up change resulting from this type of change in the workpiece, a predetermined member is needed, which is formed in accordance with the shape and the dimensions of the workpiece and which holds the workpiece, a machining tool, a shape measuring instrument and the like.

For example, a workpiece conveyance device, which holds the workpiece and conveys the workpiece between a workpiece replacement position and a workpiece machining position in the machine tool, is capable of reliably holding the workpiece in order to convey the workpiece to accurate positions. Thus, in the workpiece conveyance device, a gripper for holding the workpiece is formed in accordance with the shape and the dimensions of the workpiece, and various grippers are prepared having differing shapes and dimensions for each of the workpieces. Then, in the machine tool, when a workpiece to be machined is changed, in the workpiece conveyance device, the set-up change to a gripper corresponding to a workpiece after the change is performed.

CITATION LIST

Patent Document

Patent Document 1: Japanese Unexamined Patent Application Publication No. 2012-166330A

SUMMARY OF INVENTION

Technical Problem

However, the gripper is fixed to a main body of the workpiece conveyance device by bolts or the like, and in the gripper set-up change operation, an operator needs to use a tool to tighten the bolts in each location. As a result, the gripper set-up change operation for the workpiece conveyance device requires a lot of effort and time. Further, in a case where positioning is not correctly performed when the gripper is mounted on the main body of the workpiece conveyance device, there is a risk that a conveyance fault or the like of the workpiece may occur, and thus, the operator must perform correct positioning of the gripper with respect to the main body of the workpiece conveyance device. In other words, the gripper set-up change operation requires effort and time, and only certain operators are able to perform the operation.

The gripper set-up change operation is performed while the machine tool is not in operation, and thus, due to the fact that the set-up change operation takes time, the downtime of the machine tool increases. As a result, with the object of improving the operating ratio of the machine tool, there is a demand to reduce the time for the set-up change operation of the gripper and the like, which is the downtime.

Note that, in the workpiece conveyance device, by adopting an opening/closing type gripper (such as that disclosed in Patent Document 1, for example) that can open and close claws of the gripper in accordance with the shape and dimensions of the workpiece, the single opening/closing type gripper can be commonly used for a plurality of types of the workpiece having differing dimensions or shapes, and the gripper set-up change itself can thus be reduced to some extent in the machine tool. However, since the single opening/closing type gripper cannot be commonly used for all of the workpieces to be machined by the machine tool, the gripper set-up change operation in the machine tool is not eliminated.

In light of the foregoing, an object of the present invention is to simplify a set-up change operation of a predetermined member, such as a gripper for holding a workpiece, to shorten an operation time, and to generalize the operation so as to enable any operator to perform the operation.

Solution to Problems

A part-holding device according to a first invention to solve the above-described problems is a part-holding device including a holding portion configured to hold an object to be held, and a main body configured to detachably connect to the holding portion. The main body has a first surface, a second surface oriented in a direction different to that of the first surface, a third surface oriented in a direction different to those of the first surface and the second surface; and the holding portion has a first abutting surface capable of abutting against the first surface of the main body, a second abutting surface capable of abutting against the second surface of the main body, and a third abutting surface capable of abutting against the third surface of the main body. The part-holding device further includes pressing means configured to press the holding portion to cause the first abutting surface to abut against the first surface and to cause the second abutting surface to abut against the second surface; and fixing means configured to cause the third abutting surface to abut against the third surface and to fix the holding portion to the main body.

With respect to the part-holding device according to the first invention, in the part-holding device according to a second invention to solve the above-described problems, the first surface and the second surface are side surfaces of a groove provided in the main body, the third surface is a bottom surface of the groove, and the pressing means is provided on the main body and is configured to press the holding portion toward a corner formed by the first surface and the second surface.

With respect to the part-holding device according to the first or second invention, in the part-holding device according to a third invention to solve the above-described problems, the main body has a screw hole opening on the third surface, and the fixing means includes a screw portion that is screwed into the screw hole, a pressing portion that comes into close contact with the holding portion to press the holding portion against the main body through screwing of the screw portion into the screw hole, and a switching portion that switches between states of the screw portion being rotatable or not rotatable with respect to the main body.

With respect to the part-holding member according to any one of the first to third inventions, in the part-holding device according to a fourth invention to solve the above-described problems, the pressing means is a spring plunger.

With respect to the part-holding member according to any one of the first to fourth inventions, the part-holding device according to a fifth invention to solve the above-described problems includes a cover member that is detachably provided on the main body and that covers the first surface, the second surface, and the third surface of the main body, and the first abutting surface, the second abutting surface, and the third abutting surface of the holding portion.

A machine tool according to a sixth invention to solve the above-described problems includes a workpiece conveyance device configured to convey a workpiece to be machined. The workpiece conveyance device includes the part-holding device according to any one of the first to fifth inventions in which the object to be held is the workpiece.

A machine tool according to a seventh invention to solve the above-described problems includes a tool holding device configured to hold a machining tool for machining a workpiece, and the tool holding device includes the part-holding device according to any one of the first to fifth inventions in which the object to be held is the machining tool.

A machine tool according to an eighth invention to solve the above-described problems includes a shape measuring device configured to measure a shape of an object to be machined, and the shape measuring device includes the part-holding device according to any one of the first to fifth inventions in which the object to be held is a measuring instrument for measuring the shape of the object to be machined.

Advantageous Effects of Invention

According to the part-holding device according to the first invention, positioning of the holding portion in two directions can be performed using the single pressing means, and positioning and fixing of the holding portion and the main body can be performed in one direction using the single fixing means. Thus, the holding portion and the main body can be connected in the part-holding device using a simple structure, and replacement of the holding portion, namely, a set-up change operation, can be simplified. At the same time, an operation time can be shortened and the operation can be generalized so as to enable any operator to perform the operation.

According to the part-holding device according to the second invention, the first surface, the second surface, and the third surface of the main body can be easily provided, and the positioning of the holding portion and the main body in the two directions can be reliably performed using the single pressing means.

According to the part-holding device according to the third invention, the positioning and fixing of the holding portion and the main body can be performed in the one direction using the single fixing means, and a release of the connection between the holding portion and the main body caused by vibrations or the like can be inhibited. Conventionally, tightening bolts by an appropriate torque ensures reliable fixing, but a tool is required to tighten the bolts, and this takes time and effort. On the other hand, according to the part-holding device according to the third invention, the reliable fixing can be realized by the fixing means without any tool. Specifically, both the tool-less procedure and reliable fixing can be achieved. In other words, as well as simplifying the set-up change operation, the operation time can be shortened and the operation can be generalized so as to enable any operator to perform the operation.

According to the part-holding device according to the fourth invention, pressing means having a low cost and simple structure can be used.

According to the part-holding device according to the fifth invention, the first surface, the second surface, and the third surface of the main body, and the first abutting surface, the second abutting surface, and the third abutting surface of the holding portion can be inhibited from becoming contaminated by chips generated during the machining, machining oil, or the like, thus avoiding connection (mounting) defects between the holding portion and the main body. As a result, positioning accuracy of the holding portion and the main body can be secured.

According to the machine tool according to the sixth invention, the set-up change operation of the holding portion in the workpiece conveyance device of the machine tool can be easily performed.

According to the machine tool according to the seventh invention, the set-up change operation of the holding portion in the tool holding device of the machine tool can be easily performed.

According to the machine tool according to the eighth invention, the set-up change operation of the holding portion in the shape measuring device of the machine tool can be easily performed.

DESCRIPTION OF EMBODIMENT

The following describes in detail an embodiment of a part-holding device according to the present invention, with reference to the drawings. Note that, in the following embodiment, the part-holding device according to the present invention is adopted in a workpiece conveyance device in a hobbing machine, and is designed to simplify a set-up change operation of a gripper for holding a workpiece, thereby enabling the operation to be performed without any tool such as a wrench. Of course, the present invention is not limited to the following embodiment, and it goes without saying that various changes are possible insofar as they do not depart from the scope and spirit of the present invention.

First Embodiment

The structure of a machine tool provided with the part-holding device according to the first embodiment will be described with reference to FIGS. 1 to 8.

Figure 7:
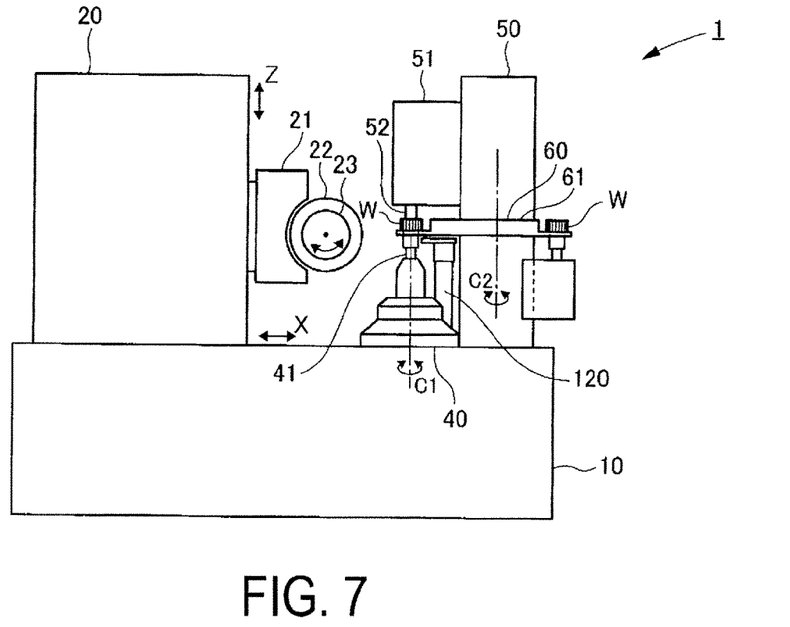
FIG. 7 is a side view illustrating a machine tool provided with the part-holding device according to the first embodiment.
Figure 8:
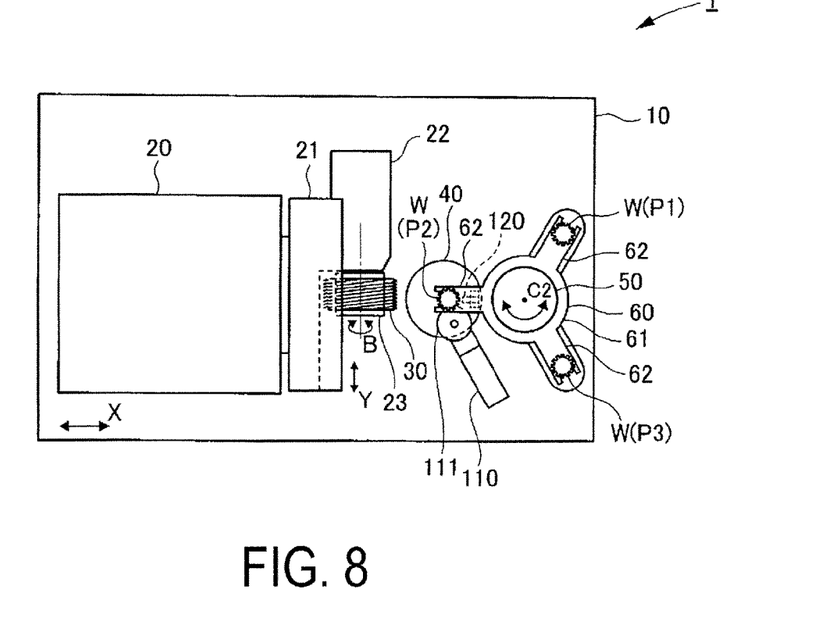
FIG. 8 is a plan view illustrating the machine tool provided with the part-holding device according to the first embodiment.

As illustrated in FIGS. 7 and 8, a hobbing machine 1, which is a gear machining device (machine tool), is provided with a bed 10. The bed 10 has a column 20 supported thereon such that the column 20 can move in a horizontal X-axis direction. The column 20 has a saddle 21 supported thereon such that the saddle 21 can ascend and descend in a vertical Z-axis direction. The saddle 21 has a hob head 22 supported thereon such that the hob head 22 can move in a Y-axis direction that is orthogonal to the X-axis direction and the Z-axis direction. In addition, the hob head 22 has a hob main shaft 23 supported thereon such that the hob main shaft 23 can rotate about a horizontal hob rotation axis B. The hob main shaft 23 has a hob cutter 30, which is a machining tool for machining a gear (a machining tool), detachably mounted to the tip end of the hob main shaft 23.

Thus, driving the column 20, the saddle 21, and the hob head 22 causes the hob cutter 30 to be moved in the X-axis direction, the Z-axis direction, and Y-axis direction, respectively. In addition, rotating the hob main shaft 23 through the hob head 22 causes the hob cutter 30 to be rotated about the hob rotation axis B.

Further, as illustrated in FIGS. 7 and 8, the bed 10 has a cylindrical table 40 provided thereon such that the table 40 faces the hob cutter 30 of the column 20. The table 40 has a lower workpiece fixture 41 for clamping a workpiece supported thereon such that the workpiece fixture 41 can rotate about a vertical workpiece rotation axis C1 and can slide in the direction of the axis (the workpiece rotation axis C1).

Further, the bed 10 has a counter column 50 provided thereon, on the opposite side to the column 20 with the table 40 interposed therebetween. The counter column 50 has a tailstock 51 provided thereon such that the tailstock 51 is positioned above the table 40. The tailstock 51 has an upper workpiece fixture 52 for clamping a workpiece supported therein such that the workpiece fixture 52 is coaxial with the lower workpiece fixture 41 on the table 40 and is rotatable about the workpiece rotation axis C1 and slidable in the direction of the axis (the workpiece rotation axis C1).

Thus, a workpiece W that is an external gear to be machined (an object to be machined) is clamped from above and below by the lower workpiece fixture 41 and upper workpiece fixture 52 for clamping a workpiece so as to be rotatable about the workpiece rotation axis C1.

Further, the counter column 50 has a workpiece turning device (a workpiece changer) 60 provided thereon, the workpiece turning device 60 corresponding to a workpiece conveyance device that holds and conveys the workpiece W in the hobbing machine 1. The workpiece turning device 60 has a cylindrical portion 61 and three arms (main bodies) 62 supported thereon such that the cylindrical portion 61 that engages with the counter column 50 and the three arms 62 that extend outward in the radial direction from the cylindrical portion 61 are rotatable about a vertical workpiece turning axis C2.

The three arms 62 are provided at equal angular intervals (120 degrees in the present embodiment) in the circumferential direction of the cylindrical portion 61. The respective tip end portions of the three arms 62 extend to a loading position P1 where the workpiece W is loaded onto the hobbing machine 1, a machining position P2 where gear machining is performed on the workpiece W, and an unloading position P3 where the machined workpiece W is unloaded from the hobbing device 1.

Figure 1:
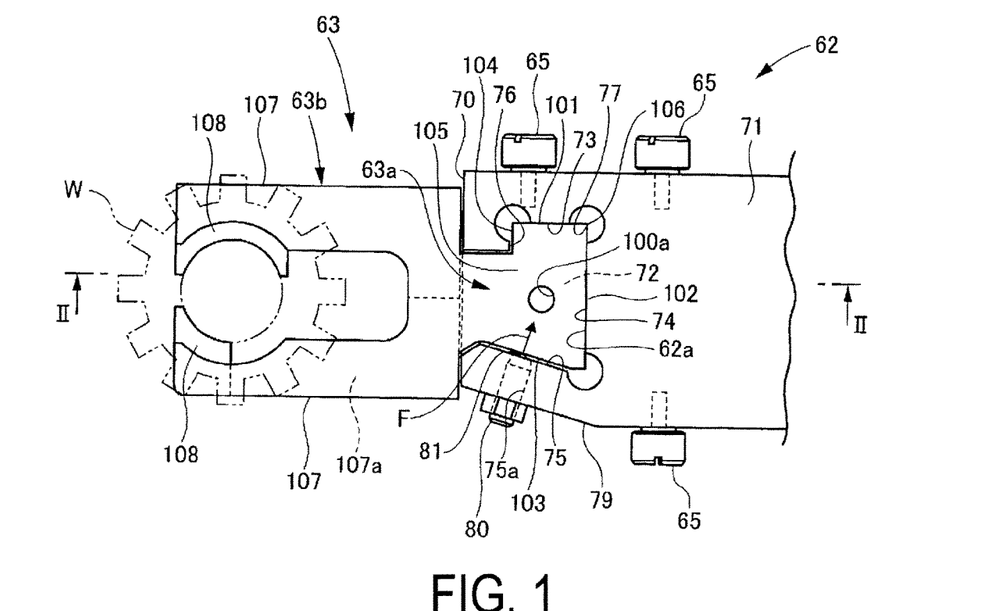
FIG. 1 is an explanatory diagram illustrating a part-holding device according to a first embodiment.
Figure 2:
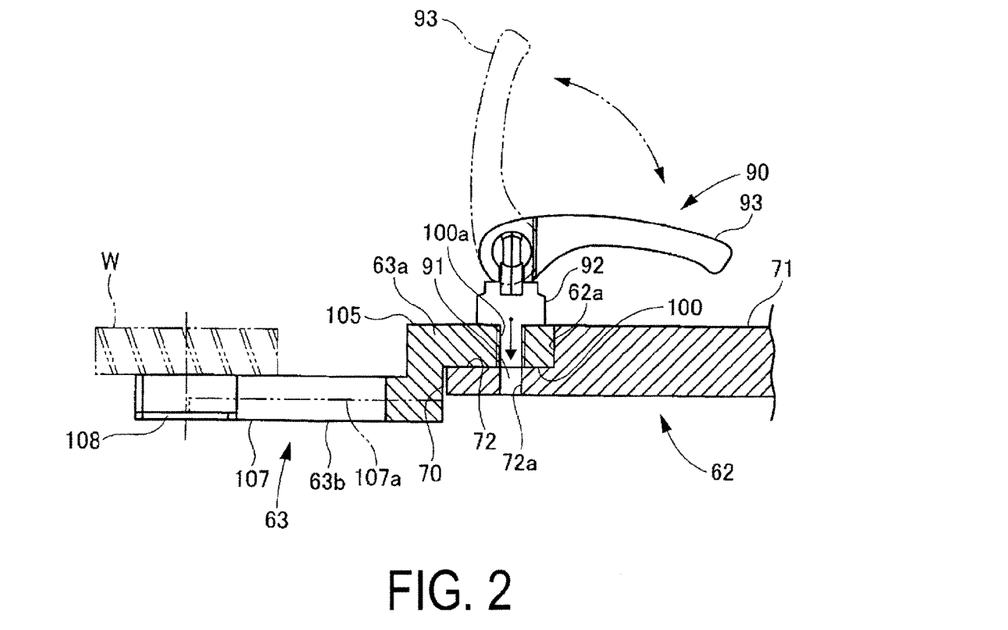
FIG. 2 is an explanatory diagram illustrating the part-holding device according to the first embodiment (a cross-sectional view in the direction of arrows II-II in FIG. 1).

As illustrated in FIGS. 1 and 2, a gripper (holding portion) 63 that is formed in accordance with the shape and dimensions of the workpiece W is detachably mounted on the tip end portion of the arm 62. This configuration allows the workpiece W to be conveyed (see FIGS. 1, 2, 7, and 8) by the cylindrical portion 61 rotating with the workpiece W held by the gripper 63 on the workpiece turning device 60. Specifically, in the workpiece turning device 60, the workpiece W held via the gripper 63 on the tip end portion of the arm 62 is conveyed in sequence to the loading position P1, the machining position P2, and the unloading position P3 by the rotation of the cylindrical portion 61.

In the present embodiment, the part-holding device according to the present invention is provided on the workpiece turning device 60. The part-holding device includes the gripper (holding portion) 63 that holds the workpiece W and the arm (main body) 62 on which the gripper 63 is detachably mounted. The attachment/detachment (replacement) of the gripper 63 to/from the arm 62, namely, the set-up change, can be performed without a tool, such as a wrench.

Figure 6:
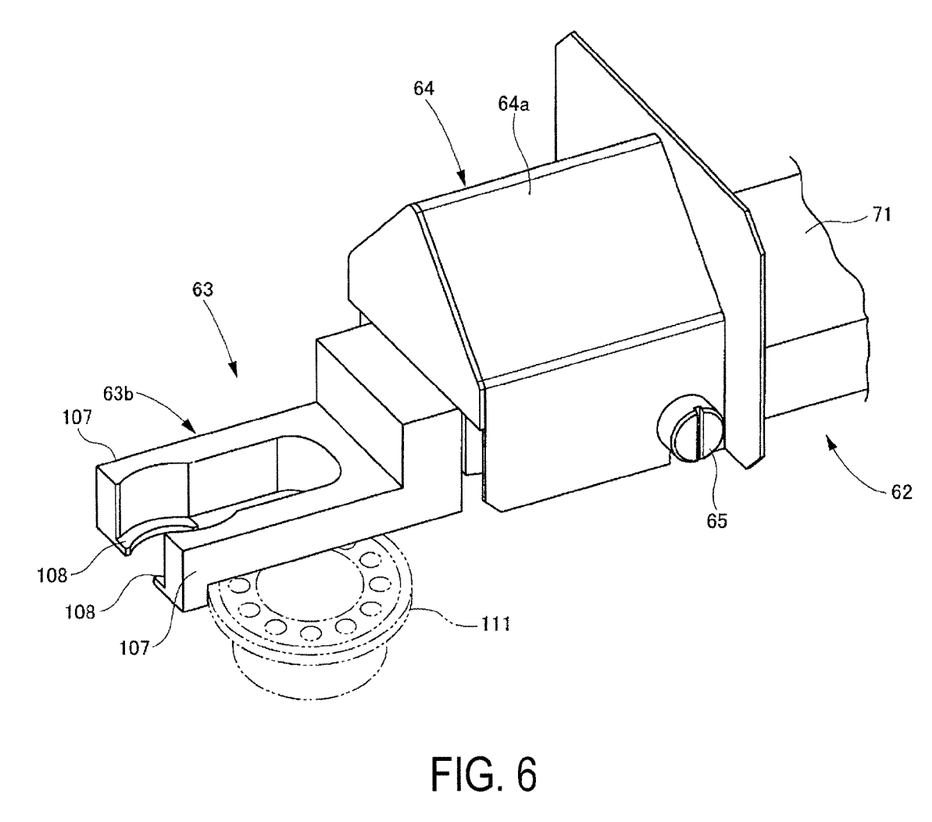
FIG. 6 is an explanatory diagram illustrating the part-holding device according to the first embodiment.

Note that, as illustrated in FIG. 6, a cover member 64 is provided on a connecting portion between the arm 62 and the gripper 63. The cover member 64 is fixed by screw members 65 screwed from both sides of the arm 62. An upper surface portion 64a of the cover member 64 is inclined so as to prevent chips generated by the machining of the workpiece W from accumulating. Further, as well as causing the upper surface portion 64a of the cover member 64 to be inclined, the cover member 64 may be formed of a material with a low friction coefficient, or have an embossed finish and the like so as to inhibit accumulation of the chips.

Figure 3A:
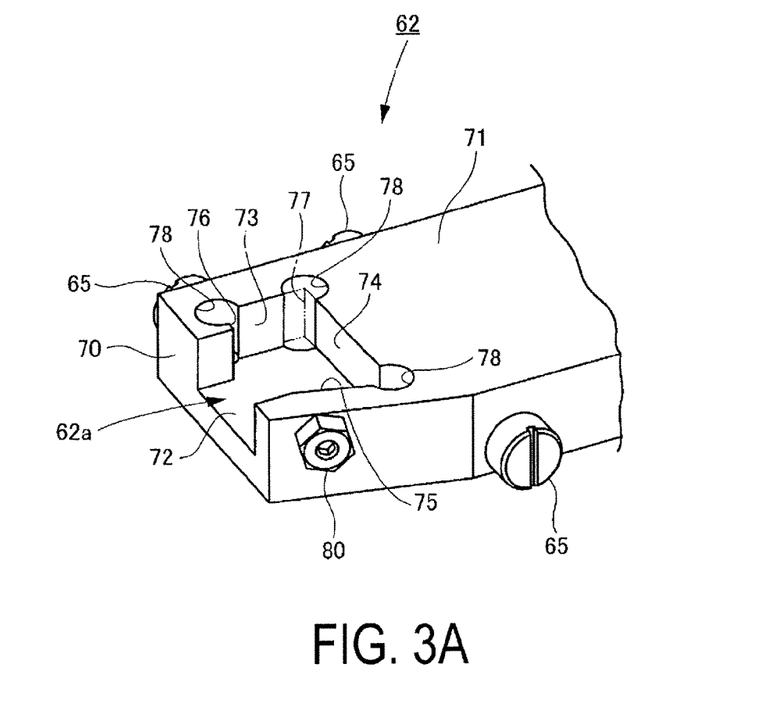
FIG. 3A is a perspective view illustrating an arm of the part-holding device according to the first embodiment.
Figure 3B:
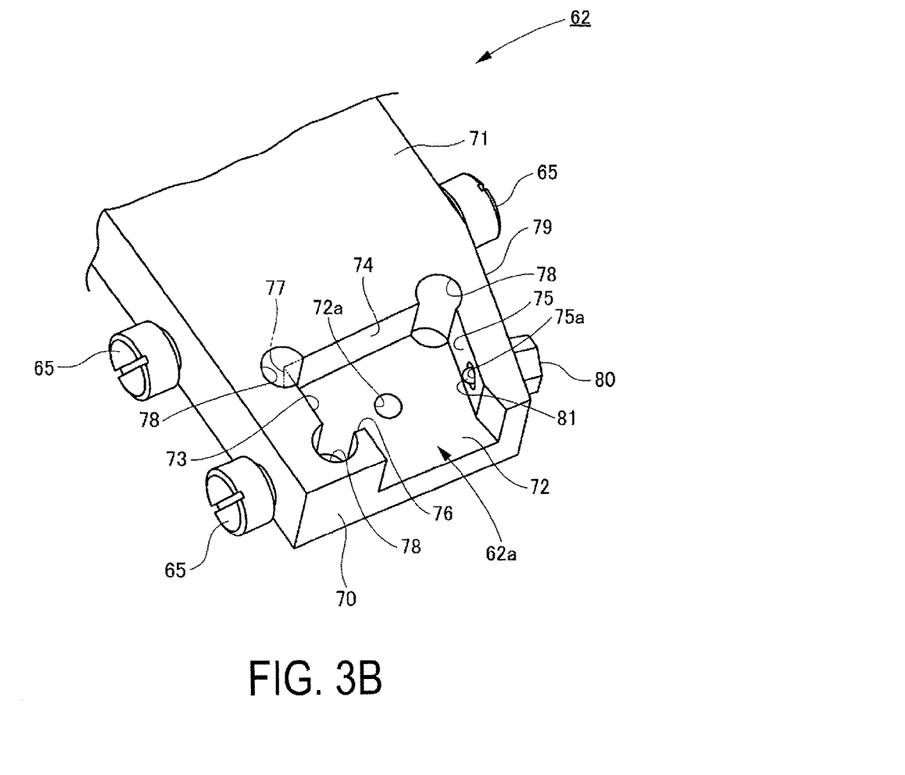
FIG. 3B is a perspective view illustrating the arm of the part-holding device according to the first embodiment.
Figure 4:
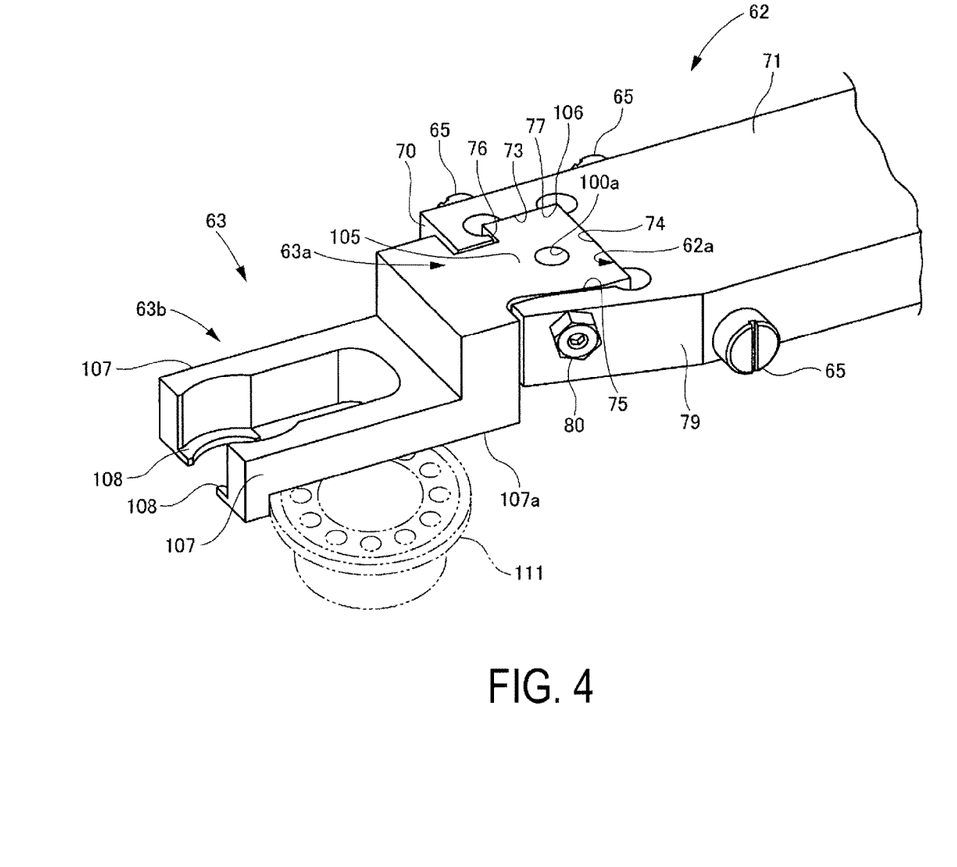
FIG. 4 is an explanatory diagram illustrating the part-holding device according to the first embodiment.
Figure 5:
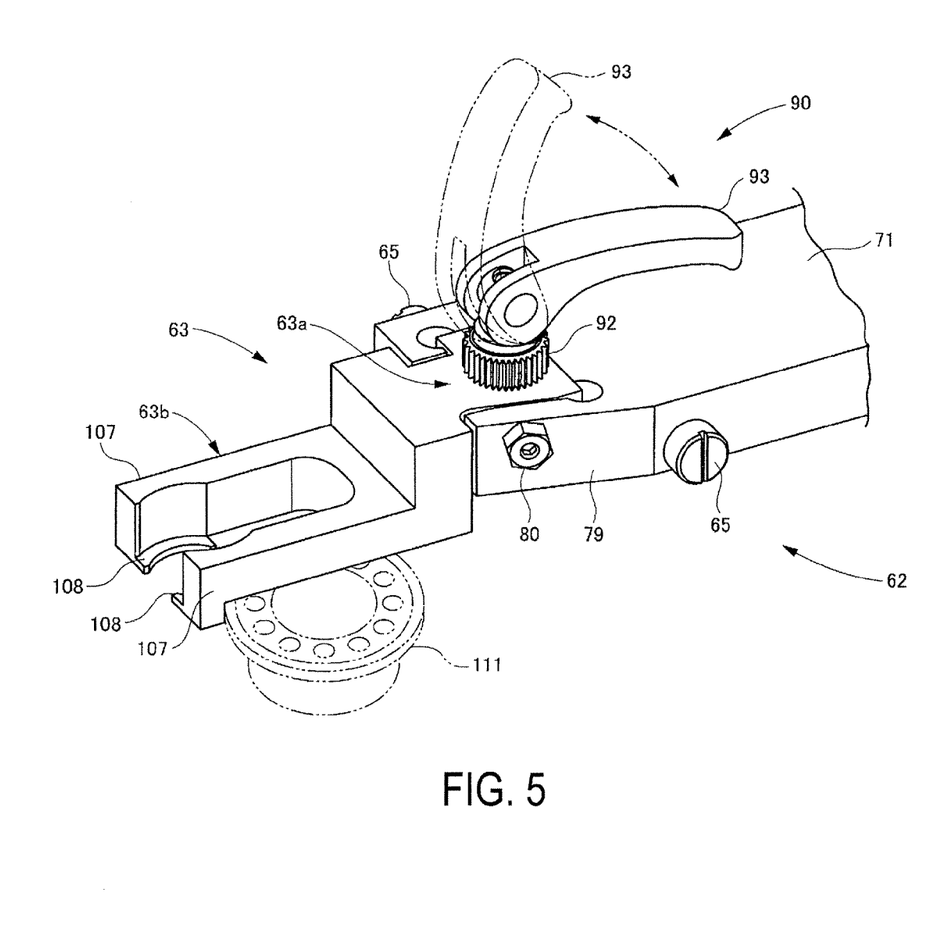
FIG. 5 is an explanatory diagram illustrating the part-holding device according to the first embodiment.

As illustrated in FIGS. 3A, 3B and 4, a gripper holding portion (groove) 62a for holding the gripper 63 is provided in the tip end portion of the arm 62. The gripper holding portion 62a is a groove formed in a tip end surface 70 and a top surface 71 of the arm 62, and has a bottom surface (third surface) 72, which has a level difference with and extends in parallel (horizontally) to the top surface 71 of the arm 62, and four side surfaces 73, 74, 75, and 76 that extend upward (vertically) from the bottom surface 72 to connect to the top surface 71.

The first side surface (first surface) 73 is orthogonal to the top surface 71 of the arm 62, and is formed along an extending direction (the left-right direction in FIGS. 1 and 2) of the arm 62. The second side surface (second surface) 74 is orthogonal to the top surface 71 of the arm 62, and is formed orthogonally to the extending direction of the arm 62, namely, to be orthogonal to the two surfaces that are the top surface 71 and first side surface 73 of the arm 62. The first side surface 73 and the second side surface 74 are provided adjacent to each other to form a right-angled corner 77. Note that, in FIGS. 3A and 3B, because the groove 62a is provided with recess portions 78 for machining, the corner 77 formed by the first side surface 73 and the second side surface 74 is illustrated by two-dot chain lines.

Further, as illustrated in FIGS. 1 and 3B, a second screw hole 75a, which opens toward the first side surface 73 and the second side surface 74, is formed in the tip end portion of the arm 62. The second screw hole 75a is configured to have a ball plunger (pressing means) 80 attached thereto. As illustrated in FIG. 3B, the ball plunger 80 is attached such that a spherical surface portion 81 at the tip end of the ball plunger 80 protrudes from the third side surface 75 and is exposed to the space of the groove 62a. The ball plunger 80 is configured to press an attachment portion 63a of the gripper 63 that is accommodated in the groove 62a of the arm 62 by a predetermined pressing force F, as illustrated in FIG. 1.

Specifically, the ball plunger 80 is the pressing means for pressing the attachment portion 63a of the gripper 63 accommodated in the groove 62a of the arm 62 against the first side surface 73 and the second side surface 74. It is sufficient that the pressing direction of the ball plunger 80 be a direction in which the attachment portion 63a of the gripper 63 can be pressed against the first side surface 73 and the second side surface 74. Note that the pressing direction is preferably in a direction bisecting the corner 77 formed by the first side surface 73 and the second side surface 74. Specifically, the pressing direction by the ball plunger 80 is a direction which is oriented toward the corner 77 formed by the first side surface 73 and the second side surface 74, and which has an angle with the first side surface 73 and an angle with the second side surface 74 that are substantially the same (45 degrees when the first side surface 73 and the second side surface 74 are orthogonal to each other).

In this way, pressing the attachment portion 63a of the gripper 63 against two surfaces oriented in differing directions (the first side surface 73 and the second side surface 74 in the present embodiment) enables the positioning of the gripper 63 with respect to the arm 62 in two directions (in the present embodiment, two directions orthogonal to each other in the horizontal plane, which are the up-down direction and the left-right direction in FIG. 1).

The first side surface 73 and the second side surface 74 are surfaces for positioning the gripper 63 with respect to the arm 62 in two directions, and thus need not necessarily be orthogonal to the top surface 71 of the arm 62 as in the present embodiment. Further, the first side surface 73 and the second side surface 74 need not necessarily be orthogonal to each other, and the corner 77 formed by the first side surface 73 and the second side surface 74 may be an acute angle or an obtuse angle.

In addition, the third side surface 75 on which the second screw hole 75a opens, and an external side surface 79 of the arm 62 positioned to the rear of the third side surface 75 are formed to be orthogonal to the second screw hole 75a, such that the second screw hole 75a can be easily machined. Specifically, the third side surface 75 is formed extending in a direction different to those of the first side surface 73 and the second side surface 74 and facing the corner 77, and the external side surface 79 is formed in parallel to the third side surface 75. Of course, the third side surface 75 and the external side surface 79 need not necessarily be orthogonal to the second screw hole 75a, and the third side surface 75 and the external side surface 79 need not necessarily be formed in parallel to each other.

Further, as illustrated in FIGS. 2 and 3B, at the tip end portion of the arm 62, the bottom surface 72 of the groove 62a is formed to be orthogonal to the first side surface 73 and the second side surface 74 and to extend in parallel (horizontally) to the top surface 71 of the arm 62. In addition, a first screw hole 72a is formed opening on the bottom surface 72. The first screw hole 72a is formed to be parallel to an assembly direction of the gripper 63 with respect to the arm 62, that is, to be parallel to the four side surfaces 73, 74, 75, and 76, and to be orthogonal to the bottom surface 72. A screw portion 91 of a clamping member 90 (to be described later) is screwed into the first screw hole 72a.

Further, in the groove 62a of the arm 62, the fourth side surface 76 is formed to be orthogonal to the extending direction of the arm 62 and to face the second side surface 74, which reliably inhibits the gripper 63 from slipping out of the arm 62.

As illustrated in FIGS. 1, 2, and 4, the gripper 63 that is detachably mounted to the arm 62 is provided with the above-described attachment portion 63a that is inserted into the groove 62a of the arm 62 to connect with the arm portion 62, and a holding portion 63b that is formed in accordance with the shape and the dimensions of the workpiece W and is configured to hold the workpiece W.

The attachment portion 63a of the gripper 63 is formed into substantially the same shape as the groove 62a and with slightly smaller dimensions than the groove 62a so as to be insertable into (accommodatable in) the gripper holding portion 62a of the arm 62. The attachment portion 63a has an end surface 100 (see FIG. 2) corresponding to the bottom surface 72 of the groove 62a, and four side surfaces 101, 102, 103, and 104 (see FIG. 1) corresponding to the four side surfaces 73, 74, 75, and 76 of the groove 62a, respectively.

The first side surface 101 is orthogonal to a top surface 105 of the gripper 63 and is formed to extend along the extending direction (the left-right direction in FIGS. 1 and 2) of the gripper 63, so as to correspond to the first side surface 73 in the groove 62a of the arm 62. The second side surface 102 is orthogonal to the top surface 105 of the gripper 63 and is formed to extend along a direction orthogonal to the extending direction of the gripper 63, so as to correspond to the second side surface 74 in the groove 62a of the arm 62. In the attachment portion 63a, the first side surface 101 and the second side surface 102 are provided adjacent to each other to form a corner 106. Note that, to correspond to the corner 77 in the groove 62a of the arm 62, the corner 106 has the same angle (90 degrees) as that of the corner 77.

Further, the third side surface 103 is formed to extend in a direction different to those of the first side surface 101 and second side surface 102 and to face toward a side opposite to the corner 106, so as to correspond to the third side surface 75 in the groove 62a of the arm 62. It is sufficient that the third side surface 103 be able to come into contact with the spherical surface portion 81 of the ball plunger 80 attached to the arm 62 such that the attachment portion 63a of the gripper 63 is pressed against the first side surface 73 and the second side surface 74 in the groove 62a of the arm 62. Thus, the third side surface 103 need not necessarily come into contact with the third side surface 75 in the groove 62a of the arm 62 when the gripper 63 is attached to the arm 62, and a gap may be generated between the third side surface 75 and the third side surface 103.

Further, the fourth side surface 104 is formed to be orthogonal to the extending direction of the gripper 63 and to face toward the opposite side to the second side surface 102, so as to correspond to the fourth side surface 76 in the groove 62a of the arm 62. The fourth side surface 104 is configured to be caught by the fourth side surface 76 in the groove 62a of the arm 62, when the gripper 63 is attached to the arm 62, to reliably inhibit the gripper 63 from slipping out. The fourth side surface 104 need not necessarily come into contact with the fourth side surface 76 and a gap may be generated between the fourth side surface 76 and the fourth side surface 104.

In addition, as illustrated in FIG. 2, a through-hole 100a is provided in the attachment portion 63a of the gripper 63, in a position corresponding to the first screw hole 72a of the arm 62, through which the screw portion 91 of the clamping member 90 (to be described later) is inserted. With this configuration, after the attachment portion 63a of the gripper 63 is inserted into the groove 62a of the arm 62, the gripper 63 and the arm 62 can be fixed by the screw portion 91 of the clamping member 90 being inserted through the through-hole 100a and screwing the screw portion 91 into the first screw hole 72a of the arm 62.

The clamping member 90 is provided with the screw portion 91 that is screwed into the first screw hole 72a of the arm 62, a rotation portion 92 that comes into close contact with the gripper 63 and pushes the gripper 63 against the arm 62 by the screw portion 91 being screwed into the first screw hole 72a, and a cam lever 93 that switches between states of the screw portion 91 being rotatable or not rotatable with respect to the arm 62. The rotation portion 92 is formed with a large diameter such that the operator can rotate the screw portion 91 and screw it into the first screw hole 72a without any tool, such as a wrench. The cam lever 93 is connected to the rotation portion 92 via a lock mechanism (not illustrated) so as to be able to lock the rotation of the rotation portion 92, as well as press the rotation portion 92 against the arm 62.

The workpiece holding portion 63b of the gripper 63 includes two claws 107 extending in parallel to the extending direction of the gripper 63. The claws 107 each include a scooping portion 108 for scooping up the workpiece W. Inner portions of the two claws 107, and the scooping portions 108 are formed in accordance with the shape and the dimensions of the workpiece W, which enables the workpiece W to be reliably held and conveyed to an accurate position.

In addition, one of the claws 107 (on the lower side in FIG. 1) has a recess portion 107a formed therein. The recess portion 107a is configured to prevent the claw 107 from interfering with a deburring tool 111 in a deburring device 110 to be described later. This configuration allows the hob cutter 30 to perform gear machining and allows the deburring device 110 to perform deburring processing, with the arm 62 positioned at a machining position P2 with the workpiece W.

In the hobbing machine 1, as described above, the deburring device 110 (see FIG. 8) is provided that removes burrs from the workpiece W positioned at the machining position P2, and further, a shape measuring device 120 (see FIGS. 7 and 8) is provided for measuring the shape of the workpiece W positioned at the machining position P2. Note that, for ease of viewing, the deburring device 110 is not illustrated in FIG. 7.

The deburring device 110 causes the deburring tool 111 to come into contact with a first end surface of the workpiece W to remove the burrs from the workpiece W. Note that, as described above, while coming into contact with the first end surface of the workpiece W, the deburring tool 111 is designed to be accommodated in the recess portion 107a of the claw 107 so as not to interfere with the gripper 63 (see FIGS. 4, 5, and 6). The shape measuring device 120 is provided so as to be positioned directly below the gripper 63, and measures the shape of the workpiece W.

With respect to an operation to replace the gripper 63 of the hobbing machine 1 according to the present embodiment, a procedure to attach the gripper 63 to the arm 62, and a procedure to detach the gripper 63 from the arm 62 will be described.

First, the procedure to attach the gripper 63 to the arm 62 will be described.

First, as illustrated in FIG. 4, the attachment portion 63a of the gripper 63 is inserted into the groove 62a of the arm 62. As illustrated in FIGS. 1 and 2, a corner formed by the bottom surface 100 and the third side surface 103 of the attachment portion 63a comes into contact with the spherical surface portion 81 of the ball plunger 80 that protrudes into the space of the groove 62a from the third side surface 75 of the groove 62a, the spherical surface portion 81 of the ball plunger 80 is pressed and displaced outward (toward the external side surface 79), and the attachment portion 63a is accommodated in the groove 62a.

At that time, the spherical surface portion 81 of the ball plunger 80 comes into contact with the third side surface 103 of the attachment portion 63a, and a pressing force F in the axial direction of the ball plunger 80 acts on the attachment portion 63a due to the urging force of the ball plunger 80. Thus, the attachment portion 63a is accommodated in the groove 62a with the attachment portion 63a pressed toward the corner 77 of the groove 62a such that the first side surface 101 and the second side surface 102 respectively come into contact with the first side surface 73 and the second side surface 74 of the groove 62a. Specifically, the gripper 63 is positioned in two directions with respect to the arm 62.

Next, the arm 62 and the gripper 63 are fixed by the clamping member 90. The screw portion 91 of the clamping member 90 is inserted through the through-hole 100a of the gripper 63, and rotation of the rotation portion 92 of the clamping member 90 screws the screw portion 91 into the first screw hole 72a of the arm 62. At the same time, bringing the rotation portion 92 into close contact with the gripper 63 causes the gripper 63 to press against the arm 62. Thus, bringing the end surface 100 of the gripper 63 into contact with the bottom surface 72 of the arm 62 causes the gripper 63 to be positioned in one direction (the vertical direction) and to be fixed to the arm 62.

Next, operating the cam lever 93 of the clamping member 90 changes the screw portion 91 and the rotation portion 92 to the state of not being rotatable with respect to the arm 62. Specifically, the screw portion 91 and the rotation portion 92 are locked. As a result, the screw portion 91 of the clamping member 90 does not come loose due to vibrations or the like, and a state is obtained in which the arm 62 and the gripper 63 are reliably fixed. The cam lever 93 can switch between the states of the screw portion 91 and the rotation portion 92 being rotatable or not rotatable with respect to the arm 62.

Finally, the cover member 64 is attached to the arm 62 in order to inhibit contamination caused by chips generated during machining, machining oil, and the like. The cover member 64 need not necessarily be precisely attached to the arm 62. The cover member 64 is roughly positioned and fixed with a screw member 65. Here, the attachment/detachment of the screw member 65 does not require any tool or the like, and a manual operation by the operator is sufficient to attach and detach the screw member 65 to and from the arm 62.

Next, the procedure to detach the gripper 63 from the arm 62 will be described.

First, the operator manually rotates the screw member 65 to remove the cover member 64 (see FIG. 6).

Next, operating the cam lever 93 of the clamping member 90 changes the screw portion 91 and the rotation portion 92 to the state of being rotatable with respect to the arm 62. Specifically, the locking of the screw portion 91 and the rotation portion 92 is released. Then, rotating the rotation portion 92 removes the clamping member 90 from the arm 62 (see FIG. 5).

Finally, the attachment portion 63a of the gripper 63 is pulled out from the groove 62a of the arm 62 (see FIG. 4). At that time, the gripper 63 is accommodated while being pressed against the first side surface 73 and the second side surface 74 of the arm 62 by the ball plunger 80, but, since the urging force F of the ball plunger 80 acts in the horizontal direction, the operator can easily pull out the gripper 63 in a pull-out direction (the vertical direction).

In the machine tool provided with the part-holding device according to the present embodiment, the positioning of the gripper 63 and the arm 62 can be performed in the two directions by the ball plunger 80, and the positioning and fixing of the gripper 63 and the arm 62 can be performed in the one direction by the clamping member 90. As a result, the gripper 63 and the arm 62 can be connected in the workpiece turning device 60 with a simple structure, the replacement of the gripper 63, namely, the set-up change operation, can be simplified, the operation time can be shortened and the operation can be generalized so as to enable the operation to be performed by any operator.

Conventionally, tightening bolts by an appropriate torque ensures reliable fixing, but a tool is required to tighten the bolts, and this takes time and effort. On the other hand, in the machine tool provided with the part-holding device according to the present embodiment, the use of the clamping member 90 ensures reliable fixing without any tool. Specifically, both the tool-less procedure and reliable fixing can be achieved.

In the present embodiment, the holding structure of the gripper for holding the workpiece has been described, but the part-holding device according to the present invention is not limited to this structure.

Figure 9:
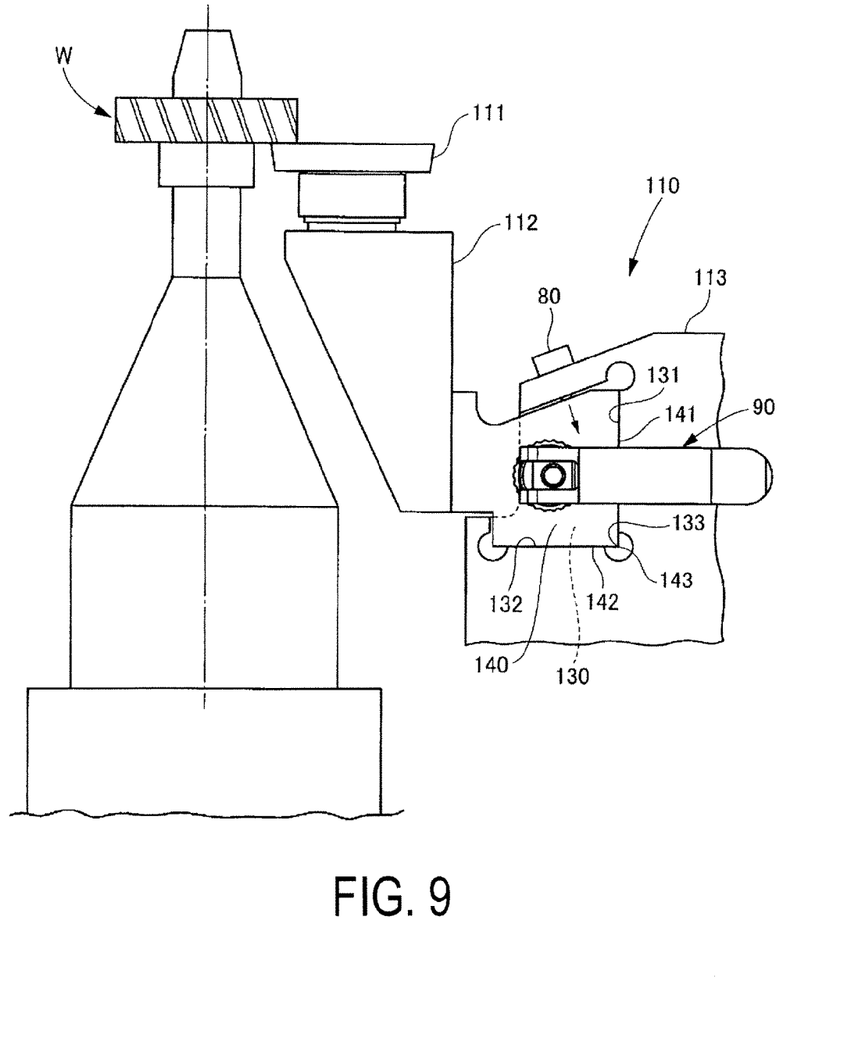
FIG. 9 is an explanatory diagram illustrating an example of the part-holding device according to the present invention applied to a deburring device.

For example, as illustrated in FIG. 9, the part-holding device according to the present invention may be applied to the deburring device 110 in the machine tool. The deburring device 110 is provided with the deburring tool 111 which comes into contact with the first end surface of the workpiece W in order to remove burrs generated by the machining, a cutter holding portion 112 for holding the deburring tool, and a main body 113 to which the cutter holding portion 112 is connected.

The main body 113 includes a groove 130 for attaching the cutter holding portion 112, and the groove 130 has a first side surface 131 and a second side surface 132 formed therein, the first side surface 131 and the second side surface 132 being oriented in differing directions.

Meanwhile, the cutter holding portion 112 includes an attachment portion 140 for attaching the cutter holding portion 112 to the main body 113. The attachment portion 140 has a first side surface 141 and a second side surface 142 formed therein, the first side surface 141 and the second side surface 142 being oriented in differing directions, such that the first side surface 141 and the second side surface 142 respectively correspond to the first side surface 131 and the second side surface 132 in the groove 130 of the main body 113.

Thus, the attachment portion 140 of the cutter holding portion 112 is inserted into the groove 130 of the main body 113, and the attachment portion 140 is pressed toward a corner 133 by the ball plunger 80, such that the first side surface 141 and the second side surface 142 of the attachment portion 140 respectively come into contact with the first side surface 131 and the second side surface 132 in the groove 130.

Then, the use of the clamping member 90 to press the cutter holding portion 112 against the main body 113 and fix the cutter holding portion 112 enables the replacement (set-up change) of the cutter holding portion 112 on the deburring device 110 without any tool such as a wrench, similar to the workpiece conveyance device of the present embodiment.

Figure 10:
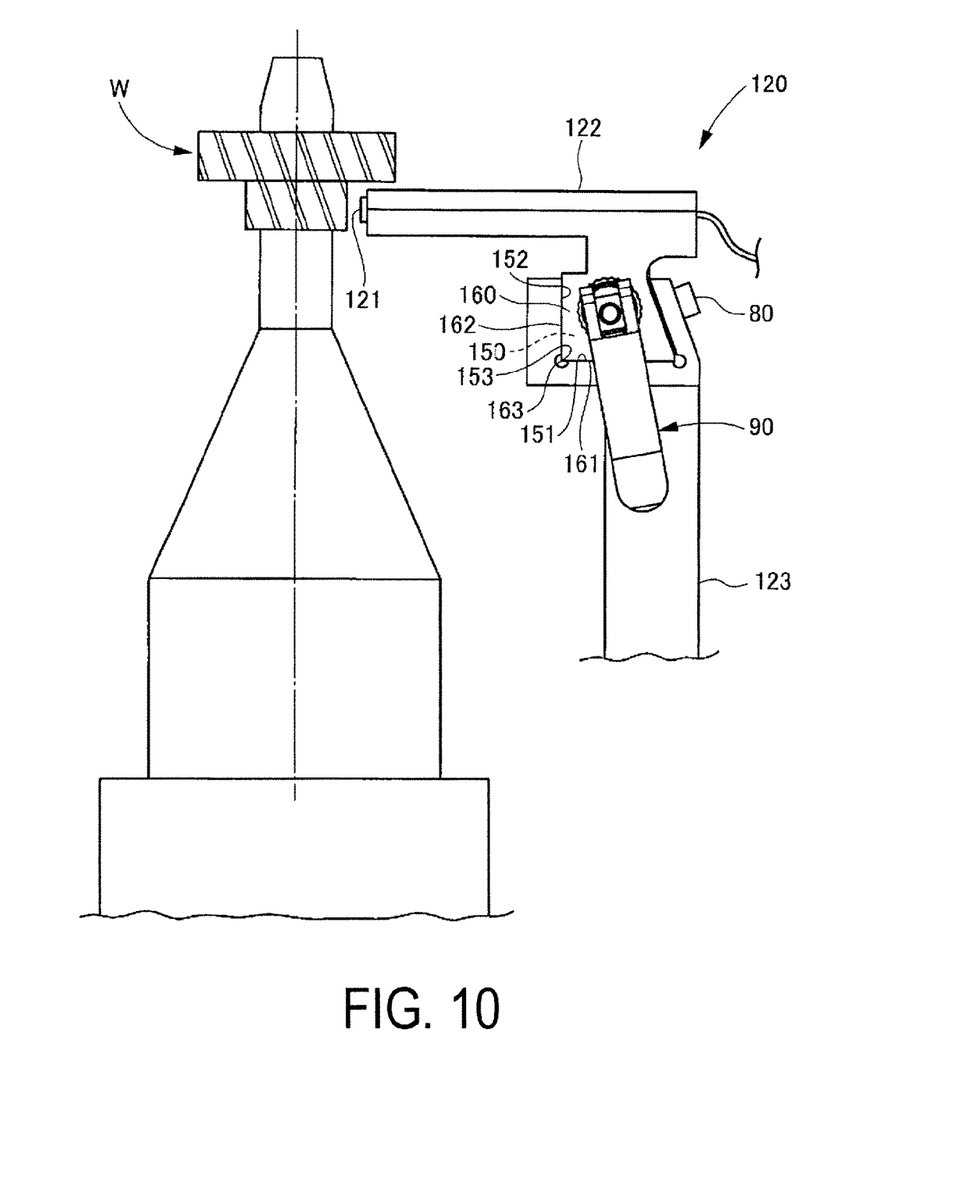
FIG. 10 is an explanatory diagram illustrating an example of the part-holding device according to the present invention applied to a shape measuring device.

Further, as illustrated in FIG. 10, the part-holding device according to the present invention may also be applied to the workpiece shape measuring device 120 in the machine tool. The workpiece shape measuring device 120 is provided with a shape sensor 121 that measures the shape of the workpiece W, a sensor holding portion 122 for holding the shape sensor 121, and a main body 123 to which the sensor holding portion 122 is connected.

The main body 123 has a groove 150 for attaching the sensor holding portion 122 formed therein, and the groove 150 has a first side surface 151 and a second side surface 152 formed therein, the first side surface 151 and the second side surface 152 being oriented in differing directions.

Meanwhile, the sensor holding portion 122 includes an attachment portion 160 for attaching the sensor holding portion 122 to the main body 123, and the attachment portion 160 has a first side surface 161 and a second side surface 162 formed therein, the first side surface 161 and the second side surface 162 being oriented in differing directions, such that the first side surface 161 and the second side surface 162 respectively correspond to the first side surface 151 and the second side surface 152 in the groove 150 of the main body 123.

Thus, the attachment portion 160 of the sensor holding portion 122 is inserted into the groove 150 of the main body 123, and the attachment portion 160 is pressed toward a corner 153 by the ball plunger 80, such that the first side surface 161 and the second side surface 162 of the attachment portion 160 respectively come into contact with the first side surface 151 and the second side surface 152 in the groove 150.

Then, the use of the clamping member 90 to press the sensor holding portion 122 against the main body 123 and fix the sensor holding portion 122 enables the replacement (set-up change) of the sensor holding portion 122 on the workpiece shape measuring device 120 without any tool such as a wrench, similar to the workpiece conveyance device of the present embodiment.

REFERENCE SIGNS LIST

1 Hobbing machine
10 Bed
20 Column
21 Saddle
22 Hob head
23 Hob main shaft
30 Hob cutter (gear machining tool, machining tool)
40 Table
50 Counter column
60 Workpiece turning device (workpiece conveyance device, work changer)
61 Cylindrical portion of workpiece turning device
62 Arm (main body) of workpiece turning device
62a Gripper holding portion (groove) of arm
63 Gripper (holding portion) of workpiece turning device
63a Attachment portion of gripper
64 Cover member of workpiece turning device
70 Tip end surface of arm
71 Top surface of arm
72 Bottom surface (third surface) of arm
72a First screw hole (screw hole) of arm
73 First side surface (first surface) of arm 74 Second side surface (second surface) of arm
75 Third side surface of arm
75a Second screw hole of arm
76 Fourth side surface of arm
77 Corner of arm
80 Ball plunger (pressing means)
90 Clamping member (fixing means)
91 Screw portion of clamping member
92 Rotation portion (pressing portion) of clamping member
93 Cam lever (switching portion) of clamping member
100 End surface (third abutting surface) of gripper
101 First side surface (first abutting surface) of gripper
102 Second side surface (second abutting surface) of gripper
103 Third side surface of gripper
104 Fourth side surface of gripper
105 Top surface of gripper
106 Corner of gripper
107 Claw of gripper
108 Scooping portion of gripper
110 Deburring device (tool holding device)
111 Deburring tool (machining tool) of deburring device
112 Cutter holding portion (holding portion) of deburring device
113 Main body of deburring device
120 Shape measuring device
121 Shape sensor (measuring instrument) of shape measuring device
122 Sensor holding portion (holding portion) of shape measuring device
123 Main body of shape measuring device

The invention claimed is:

1. A part-holding device comprising:
a holding portion configured to hold an object to be held; and
a main body configured to detachably connect to the holding portion;
wherein the main body includes:
a first surface;
a second surface oriented in a direction different to that of the first surface; and
a third surface oriented in a direction different to those of the first surface and the second surface, and the holding portion includes:
a first abutting surface capable of abutting against the first surface of the main body;
a second abutting surface capable of abutting against the second surface of the main body;
a third abutting surface capable of abutting against the third surface of the main body;
pressing means configured to press the holding portion to cause the first abutting surface to abut against the first surface in a direction parallel to the third surface and to cause the second abutting surface to abut against the second surface; and
fixing means configured to cause the third abutting surface to abut against the third surface and to fix the holding portion to the main body; wherein
the main body has a screw hole opening on the third surface, and
the fixing means includes a screw portion that is screwed into the screw hole, a pressing portion that comes into close contact with the holding portion to press the holding portion against the main body through screwing of the screw portion into the screw hole, and a switching portion that switches between states of the screw portion being rotatable or not rotatable with respect to the main body.

2. The part-holding device according to claim 1, wherein the first surface and the second surface are side surfaces of a groove provided in the main body, the third surface is a bottom surface of the groove, and the pressing means is provided on the main body and is configured to press the holding portion toward a corner formed by the first surface and the second surface.

3. The part-holding device according to claim 1, wherein the pressing means is a spring plunger.

4. The part-holding device according to claim 1, further comprising a cover member that is detachably provided on the main body and that covers the first surface, the second surface, and the third surface of the main body, and the first abutting surface, the second abutting surface, and the third abutting surface of the holding portion.

5. A machine tool comprising a workpiece conveyance device configured to convey a workpiece to be machined, wherein
the workpiece conveyance device includes the part-holding device according to claim 1 in which the object to be held is the workpiece.

* * * * *